United States Patent

[11] 3,630,581

| | | |
|---|---|---|
| [72] | Inventor | Frank T. Gostomski<br>1053 North Beech St., Wahoo, Nebr. 68066 |
| [21] | Appl. No. | 868,014 |
| [22] | Filed | Oct. 21, 1969 |
| [45] | Patented | Dec. 28, 1971 |

[54] BOGIE WHEELS FOR SNOWMOBILES
7 Claims, 4 Drawing Figs.

[52] U.S. Cl. ..................................... 305/27,
180/5 R, 280/124 R
[51] Int. Cl. ........................................... B62d 55/16
[50] Field of Search .......................................... 180/5;
305/27, 24, 23; 280/104.5, 104.5 A, 124 R

[56] References Cited
UNITED STATES PATENTS

| 1,547,043 | 7/1925 | Kegresse .................... | 305/27 |
| 1,910,798 | 5/1933 | Kegresse .................... | 305/27 |
| 3,017,942 | 1/1962 | Gamaunt..................... | 305/27 X |
| 3,285,676 | 11/1966 | Hetteen........................ | 305/27 |
| 3,362,492 | 1/1968 | Hanesen....................... | 180/5 |

*Primary Examiner*—Richard J. Johnson
*Attorney*—Henderson and Strom

ABSTRACT: A bogie wheel system adapted for use with snowmobiles is provided herein. The bogie wheel system comprises elongate first members rotatably mounted at one end on a support means and coil springs normally urging the other end of the first members downwardly. Second members are aligned with the first members and aligned with the track of the snowmobile and have axles mounted transversely of the track with bogie wheels rotatably mounted thereon. Resilient members are disposed between the first members and the second members and means are provided for securing them in aligned relation.

INVENTOR
FRANK T. GOSTOMSKI
BY Henderson & Strom
ATTORNEYS

BOGIE WHEELS FOR SNOWMOBILES

BACKGROUND OF THE INVENTION

This invention relates to improved bogie wheel systems for snowmobiles which provide deeper spring action.

Snowmobiles have been widely used as winter vehicles and now, in addition, are gaining popularity as summertime vehicles. Snowmobiles, especially when used without snow cover, are subjected to very rough terrain and excessive punishment. Present bogie wheel systems are not engineered properly to withstand this punishment and do not provide sufficiently deep spring action to be utilized in this manner.

Typical bogie wheel systems adapted for smooth snow are exemplified by Bombadier, U.S. Pat. No. 3,023,824; Hanson, U.S. Pat. No. 3,362,492; and LaPorte, U.S. Pat. No. 2,925,873.

The bogie wheel system of this invention eliminates the above-described problems. The bogie wheel system is relatively simple, is engineered to withstand rough treatment, and provides deep spring action.

SUMMARY OF THE INVENTION

This invention relates to a bogie wheel means for a snowmobile-type vehicle having a drivable, endless track for motive power and means for driving the track. The bogie wheel means comprises a support means formed on the vehicle and disposed transversely of the track. Elongate first members are rotatably mounted on the support means and extend rearwardly therefrom. Spring means are utilized to normally urge the ends of the first members downwardly. Second members are aligned with the track and with the first members and have at least two axles disposed transversely of the track. Bogie wheels are rotatably mounted on the axles and normally contact the upper surface of the portion of the track in contact with the ground. Resilient means are disposed between the first and second members and means for securing the first members, the resilient means, and the second members in aligned relation are provided.

An advantage of this invention over the prior are devices is that this bogie wheel means provides deeper spring action. Therefore, the snowmobile can be used on very rough terrain without damage to the snowmobile and with relatively little discomfort to the passengers.

Additionally, by providing resilient means between the first and second members, shock is not transmitted directly to the support means. The provision of this resilient means prevent excessive wear at the support means.

It the snowmobile leaves the ground, the first member rotates downwardly. The initial shock is absorbed by the rear bogie wheel and the resilient means. Additionally, the track is so positioned by the bogie wheel means to make maximum contact with the ground when the snowmobile hits the ground.

DESCRIPTION OF THE PREFERRED EMBODIMENTS

Figures 1, 2, 3, 4:
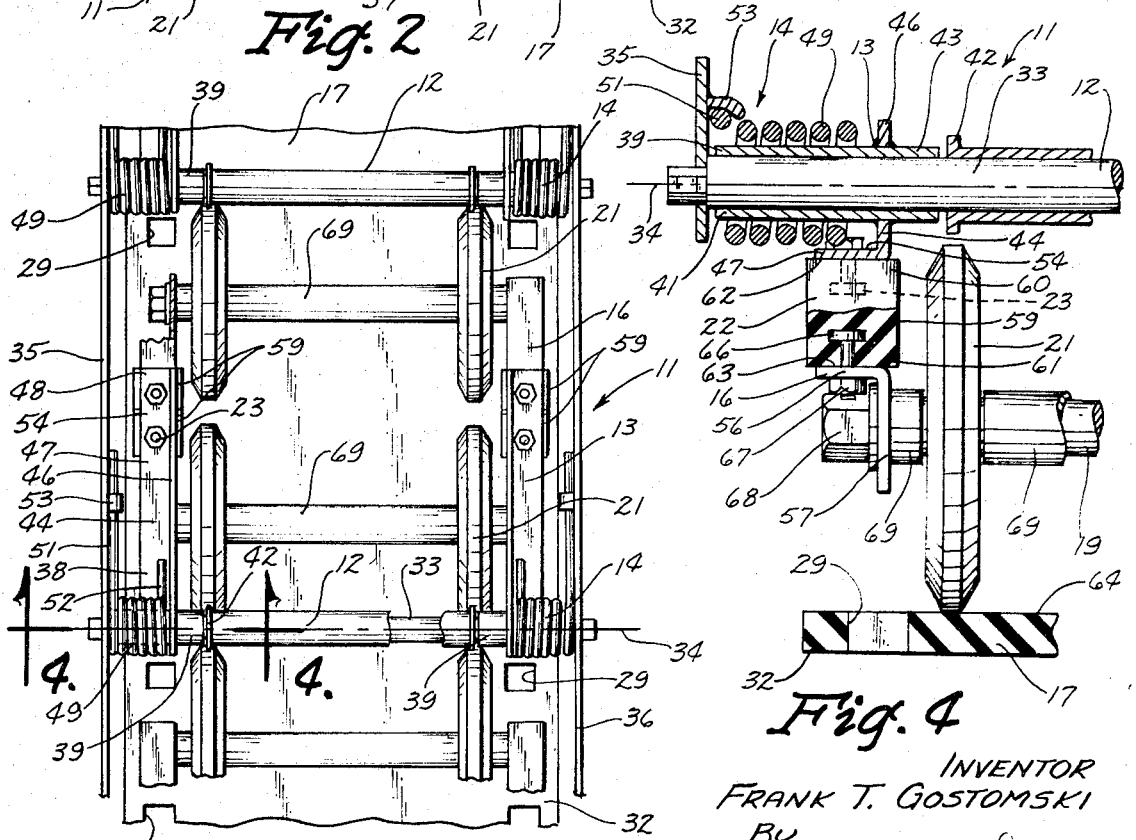
FIG. 1 is a perspective view of a snowmobile with the side partially cut away to illustrate the placement of the bogie wheel means of this invention.
FIG. 2 is an enlarged side view of the bogie wheel means with the side of the snowmobile partially cut away.
FIG. 3 is a top view of the bogie wheel means taken along the line 3—3 of FIG. 2.
FIG. 4 is an enlarged cross-sectional view of the bogie wheel means taken along the line 4—4 of FIG. 3.

The bogie wheel means of this invention is indicated generally at 11 in FIGS. 1–4. The bogie wheel means 11 comprises a support means 12 (FIGS. 2–4), elongate first members 13 rotatably mounted thereon, and spring means 14 normally urging the first members 13 downwardly. Second members 16 are aligned with the first members 13 and the track 17 of the snowmobile 18 and have axles 19 mounted transversely of the track 17 with bogie wheels 21 rotatably mounted thereon. Resilient means 22 are disposed in aligned relation between the first members 13 and the second members 16 and means 23 for securing these elements in alignment are provided.

More specifically, the bogie wheel means 11 is utilized with a conventional snowmobile 18 (FIG. 1) to maintain the track 17 in constant contact with the ground surface without humping or doubling up of the track 17. The snowmobile 18 generally comprises a light gauge metal shell 24 having a motor (not shown) mounted therein. Skis 26 support the front end of the snowmobile 18 and are rotatable with steering bar 27. A passenger seat 28 is normally provided on the rear of the snowmobile 18.

Motive power for the snowmobile 18 is provided by a drivable, endless track 17 (FIGS. 1–4) which has a series of longitudinally aligned holes 29 formed therethrough. The motor is utilized to turn a drive pulley (not shown) which rotates the track 17. A rear idler wheel 31 guides the track 17. As shown in FIGS. 1 and 2, the track 17 has a first portion 32 which is normally in contact with the ground and a second portion (not shown) which is suspended over the first portion 32. The bogie wheel means 11, in addition to maintaining the first portion 32 of the track 17 in constant contact with the ground, is adapted to cushion the ride over rough terrain.

The support means 12 is formed on the snowmobile 18 and disposed transversely of the track 17. Preferably, the support means 12 is formed horizontally and disposed between the first portion 32 and the second portion of the track 17.

To strengthen the bogie wheel means 11 and provide additional rigidity to the snowmobile 18, the support means 12 can be a cross-shaft 33. The cross-shaft 22 extends through the shell 24 of the opposing sides 35 and 36 (FIG. 3) of the snowmobile 18 and is preferably secured to or though the frame 37 (FIG. 1) of the snowmobile 18. The cross-shaft 33 is generally of cylindrical configuration to readily allow the first members 13 to rotate about the longitudinal axis 34 thereof. However, any normal configuration could be utilized herein.

Elongate first members 13 are mounted proximate one end 38 (FIGS. 2 and 3) thereof on the support means 12 or cross-shaft 33 and extend rearwardly therefrom. The first members 13 are rotatable about the longitudinal axis 34 of the cross-shaft 33 as shown in FIG. 2.

As shown in FIG. 4, the first members 13 generally comprise a hollow cylindrical portion 39 which is rotatably secured around the cross-shaft 33. This portion 39 is spaced from the shell 24 or frame 37 on one end 41 and from a stop 42 on the other end 43 thereby insuring sufficient play to allow the first members 13 to rotate freely. Rigidly affixed to the cylindrical portion 39 is a strut 44 bent at right angles and extending rearwardly. The upper portion 46 of the strut 44 is vertically disposed while the lower portion 47 is normally horizontally disposed and extends outwardly (FIGS. 3 and 4).

The other ends 48 of the first members 13 have two apertures (not shown) formed therethrough for securing the resilient means 22 thereto. In the bogie wheel means 11 illustrated herein, it is preferred that two aligned first members 13 be utilized, one proximate each side 35 and 36 of the snowmobile 18. It is also preferred herein that the first members 13 be normally disposed in a horizontal plane when they are in an installed position. This can be accomplished by utilizing the proper spring tension in spring means 14 and sufficient resiliency in resilient means 22.

Spring means 14 (FIGS. 2–4) normally urges the other ends 48 of the first members 13 downwardly. Although a number of springs may be adapted for this purpose, coil springs 49 having two projecting ends 51 ad 52 have been found to be most useful herein. The coil springs 49 encircle the hollow cylinder 39 and, therefore, the cross-shaft 33. One of the ends 51 of the spring 49 is secured against the side 35 of the snowmobile 18 by lug 53 formed on the side 35. The other of said ends 52 is juxtaposed along the upper surface 54 of the lower portion 47 of the strut 44 and urges the first member 13 to rotate downwardly around the cross-shaft 33.

The second members 16 (FIGS. 2-4) are aligned with the track 17 and one of the second members 16 is aligned with each of he first member 13. The second members 16 are normally disposed horizontally and parallel of the first members 13. Preferably, the second members 16 are disposed below the rearwardly extending ends 48 of the first members 13.

The second members 16 are generally formed from angle iron or the like with the upper portion 56 being horizontally disposed and extending outwardly. The lower portion 57 is vertically disposed and has two openings (not shown) formed near the ends 58 and 58a thereof through which the axles 19 can be secured to the second member 16. Apertures (not shown) are also formed through the upper portion 57 which are vertically alignable with the apertures formed through the rearwardly extending ends 48 of the first members 13. The apertures in the upper portion 57 are formed centrally between the axles 19.

Resilient means 22 are disposed between each of the first members 13 and the second members 16 are shown in FIGS. 2-4. The resilient means are juxtaposed proximate the rearwardly extending end 48 of the first members 13.

The resilient means comprises at least one resilient member 59, and preferably comprises two resilient members 59 as shown in FIGS. 2-4, having an upper end 60 and a lower end 61. The upper end 60 is generally juxtaposed against he bottom surface 62 of the lower portion of the strut 44 while the lower and 61 is juxtaposed against the top surface 63 of the upper portion 56 of the second member 16. Preferably the resilient members 59 and the above referred to portions of the first 13 and second 16 members are all vertically aligned.

The outer configuration of the resilient members 59 is not critical; however, rectangular or cylindrical shapes are generally preferred. The resilient members 59 are preferably constructed from rubber or rubberlike materials. These rubberlike materials absorb the initial shock on contacting the ground surface and allow the track 17 to conform to the terrain. Additionally, the resilient members 59 prevent the bogie wheels 21 from turning completely over and thereby losing contact with the upper surface 64 of the first portion 32 of the track 17.

Means 23 are provided for securing the first members 13, the resilient members 59, and the second members 16 in alignment. The resilient members 59 can be secured by cementing them in place or by inserting bolts vertically therethrough. As shown in FIG. 4, the means 23 can also be bolts 66 molded into the resilient members 59. The bolts 66 are secured to, respectively, the first 13 and second 16 members by nuts 67. The bolts 66 extend through the apertures previously described thereby mounting the resilient members 59 centrally between the axles 19 on the second members 16.

At least two axles 19 are mounted on each of the second members 16 and are disposed transversely of the track 17. The axles 19 should be horizontally mounted and aligned with each other. For maximum strength, the axles 19 should extend horizontally between aligned second members 16 on shown in FIG. 3. The axles 19 are generally threaded on the ends thereof and secured in the openings in the second members 16 by nuts 68 (FIG. 4).

Hollow cylindrical spacers 69 (FIG. 4) fit over the axles 19 and maintain the bogie wheels 21 in the proper alignment. Other conventional methods of maintaining the bogie wheels 21 in proper alignment can also be utilized herein.

Bogie wheels 21 are rotatably mounted on the axles 19 and normally contact the upper surface 64 of the track 17. The wheels 21 can be formed from any material, however, a rubberlike material is preferred for use herein to minimize wear on the track 17.

Although a preferred embodiment has been described hereinbefore it is to be remembered that various modifications may be made without departing from the invention as defined in the appended claims.

I claim:

1. Bogie wheel means for a snowmobile-type vehicle having a drivable, endless track for motive power and means for driving the track, the track having a first portion thereof normally in contact with the ground and a second portion thereof suspended over the first portion, said bogie wheel means comprising:

horizontally disposed support means formed on said vehicle between the first and second portions of the track and disposed transversely of the track;

elongate first members mounted proximate one end thereof on said support means and extending rearwardly thereof, said first members being rotatable about the longitudinal axis of said support means;

spring means normally urging the other ends of said first members downwardly;

second members aligned with the track, one of said second members being aligned with each of said first members;

at least one resilient member disposed between each said first member and its aligned second member, said at least one resilient member having an upper end and a lower end, said upper end secured to said first member and said lower end secured to said second member;

means securing said first members, said resilient members, and said second members in aligned relation;

at least two horizontally disposed axles mounted on each of said second members and disposed transversely of the track;

bogie wheels, at least one of said wheels being rotatably mounted on each of said axles and normally contacting the upper surface of the first portion of the track.

2. The bogie wheel means of claim 1 wherein two axles are mounted in aligned relation on each of said second members; and said resilient means are mounted centrally between said axles on said second members.

3. The bogie wheel means of claim 2, which contains two aligned first members and two aligned second members and wherein said axles extend horizontally between said aligned second members.

4. The bogie wheel means of claim 3, wherein said support means in a cross-shaft extending between opposing sides of the vehicle.

5. The bogie wheel means of claim 4, wherein said spring means comprises:

coil springs having two projecting ends and encircling said cross-shaft;

one of said ends being secured to said vehicle; and the other of said ends juxtaposed along the upper surface of said first member and normally urging said other end of said first members downwardly.

6. The bogie wheel means of claim 5, wherein said first members and said second members are normally disposed in horizontal and parallel relation.

7. The bogie wheel means of claim 6, wherein said resilient members are formed from rubberlike material.

* * * * *